(12) United States Patent
DeLair et al.

(10) Patent No.: US 7,495,363 B2
(45) Date of Patent: Feb. 24, 2009

(54) MAXIMUM CONDUCTOR MOTOR AND METHOD OF MAKING SAME

(75) Inventors: Charles M. DeLair, Pomerene, AZ (US); Christopher P. Owan, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 539 days.

(21) Appl. No.: 11/314,708

(22) Filed: Dec. 21, 2005

(65) Prior Publication Data
US 2007/0138895 A1    Jun. 21, 2007

(51) Int. Cl.
*H02K 21/24* (2006.01)
(52) U.S. Cl. .................................. 310/179; 310/184
(58) Field of Classification Search ................. 310/179, 310/180, 184, 71, 201
See application file for complete search history.

(56) References Cited

U.S. PATENT DOCUMENTS

| | | | |
|---|---|---|---|
| 3,444,406 A | 5/1969 | Aha | |
| 3,774,062 A * | 11/1973 | Johnson | 310/184 |
| 4,554,491 A | 11/1985 | Plunkett | |
| 5,959,377 A | 9/1999 | Horng | |
| 6,170,974 B1 * | 1/2001 | Hyypio | 716/4 |
| 6,538,356 B1 * | 3/2003 | Jones | 310/254 |
| 6,700,236 B2 * | 3/2004 | Umeda et al. | 310/54 |
| 2005/0174006 A1 | 8/2005 | Kolomeitsev et al. | |
| 2007/0138895 A1* | 6/2007 | DeLair et al. | 310/179 |
| 2007/0216244 A1* | 9/2007 | Edelson | 310/90.5 |

FOREIGN PATENT DOCUMENTS

JP      62-233056      10/1987

* cited by examiner

*Primary Examiner*—Gary F. Paumen
(74) *Attorney, Agent, or Firm*—Renner, Otto, Boisselle & Sklar, LLP

(57) ABSTRACT

A stator assembly is provided for a multi-phase motor. The stator assembly includes a stator with a plurality of teeth and a plurality of slots defined between the teeth. In addition, the stator assembly includes a plurality of windings representing respective phases of the multi-phase motor. The windings are wound within the slots and around the teeth to define respective magnetic poles. Further, each slot includes no more than a single turn or small number of turns of any given one of the plurality of windings.

38 Claims, 8 Drawing Sheets

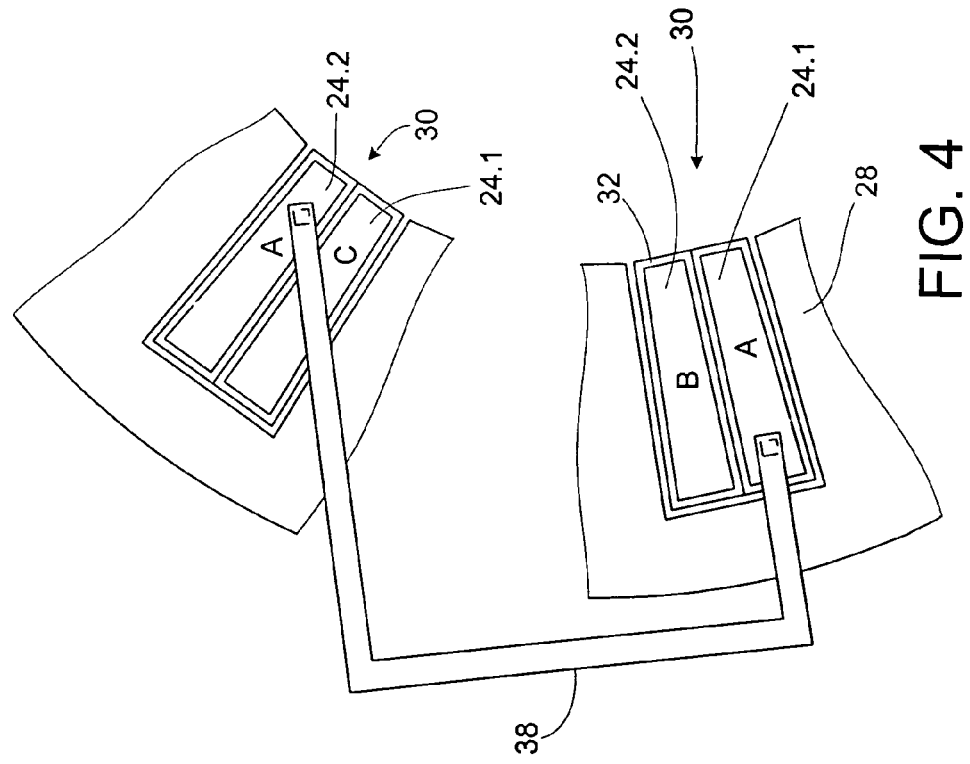
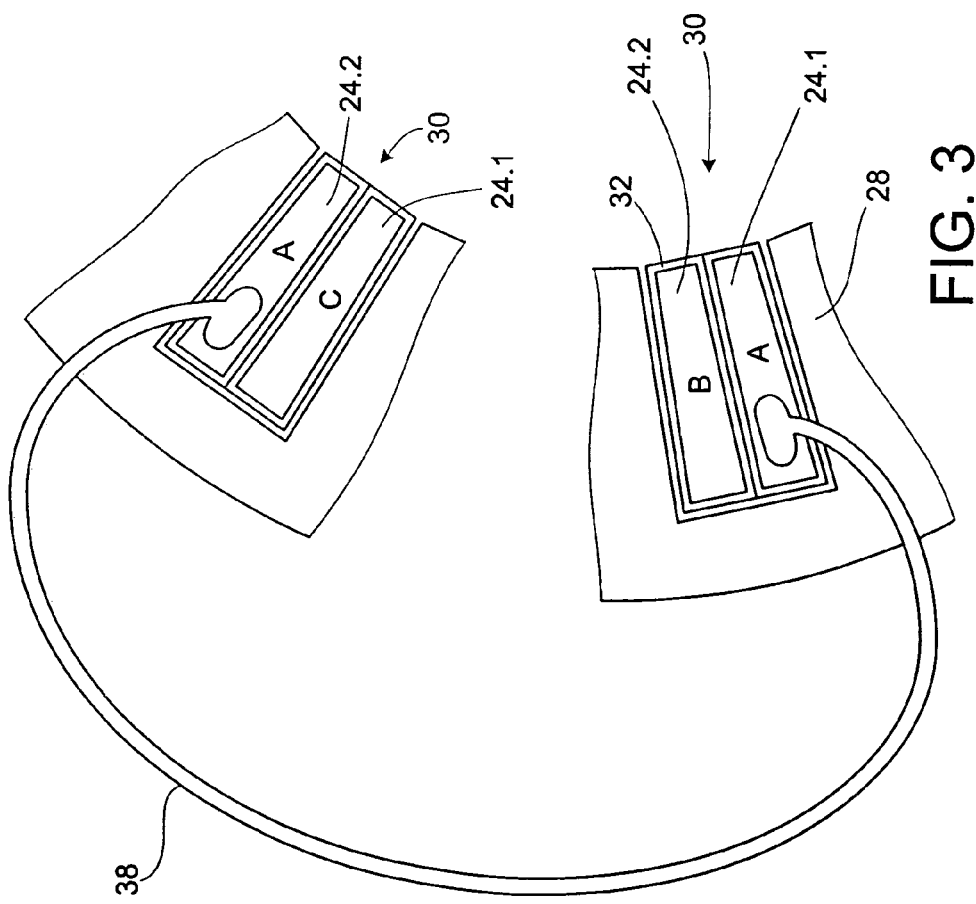

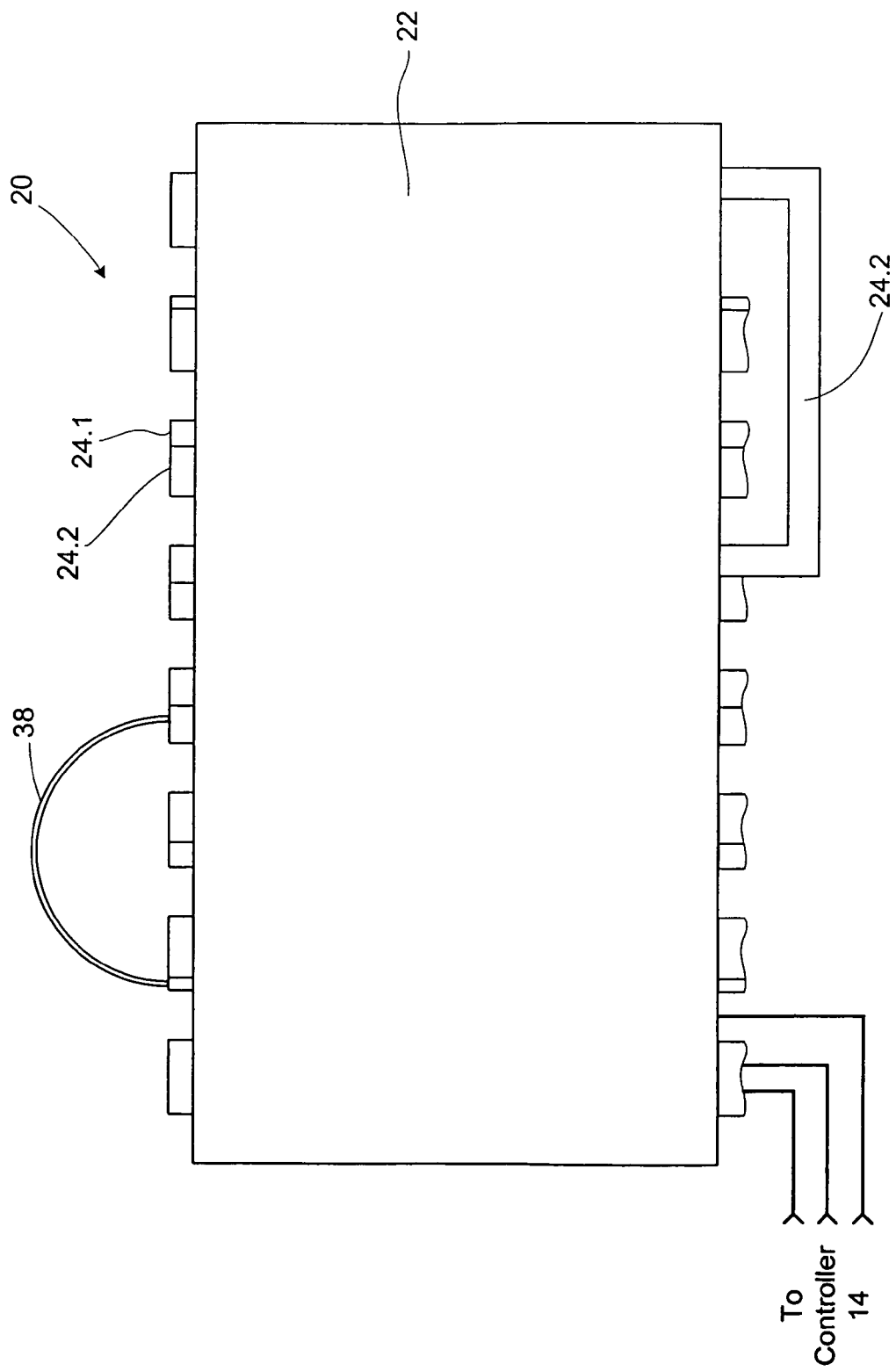

MAXIMUM CONDUCTOR MOTOR AND METHOD OF MAKING SAME

TECHNICAL FIELD

The present invention relates generally to motors, and more particularly to brushless direct current (DC) motors having reduced production costs and increased performance.

BACKGROUND OF THE INVENTION

DC motors are known in the art. Various control system implementations in a variety of architectures typically depend on a DC motor as the prime motive force. For example, a DC motor may serve to rotate or translate a panel, structure, or related device.

Designers continually face the challenge of packaging and power density with respect to DC motors. Designers typically must strive to put as much power for as low cost in as small volume as possible. In almost every control system product, a cost Pareto analysis will reveal that the most costly single component is the motor, just as it is the prime constraint to achieving a certain level of performance. In the past twenty years, motor drive electronics have been reduced dramatically in terms of size and price to enable unprecedented capability for a given package size. However, there have been no significant improvements in DC motor technologies. Many current actuation systems face an immediate need for small, high power, low cost motors, and face with price targets that present day technologies may not meet.

For example, brushless DC (BLDC) motors require more touch labor to produce as they become smaller. This is primarily because of the difficulty of winding many turns of fine wire in the slots of the stator. The best winding fill that can be produced goes towards 50% or less as the slots become smaller. Also, the motor constant (torque/root-watt) gets smaller and smaller, becoming unacceptable at some point. The performance in actuation systems also suffers as the motor gets smaller because of the reduction in bandwidth resulting from the relationship of torque diminishing faster than inertia. Thus, for the smallest actuation systems, the BLDC motors become too expensive, too sluggish, or both.

As a result, in the realm of small actuation systems, brush motors have become the motor of choice. This has been primarily on the basis of motor rotor diameter versus motor overall diameter. The performance is better than equal size BLDC motors, but frequently is not good enough. The smallest brush motors are likewise very expensive for the same reasons, and also suffer from brush noise and lack of reliability. The brushes and commutator bars pose potential problems during long storage and over-demanding environments.

In view of the aforementioned shortcomings associated with motor design for small actuation systems, there is a strong need in the art for a motor suitable for use in small actuation systems without sacrificing cost and/or performance. Moreover, there is a strong need in the art for a method of making such a motor.

SUMMARY OF THE INVENTION

According to an aspect of the invention, a stator assembly is provided for a multi-phase motor. The stator assembly includes a stator with a plurality of teeth and a plurality of slots defined between the teeth. In addition, the stator assembly includes a plurality of windings representing respective phases of the multi-phase motor. The windings are wound within the slots and around the teeth to define respective magnetic poles. Further, each slot includes only a small number of turns, i.e., ten or less, or more preferably, no more than a single turn, of any given one of the plurality of windings.

In accordance with another aspect of the invention, a stator assembly includes a stator with a plurality of teeth and a plurality of slots defined between the teeth. The stator assembly further includes a plurality of windings representing respective phases of the multi-phase motor, the windings being wound within the slots and around the teeth to define respective magnetic poles; In addition, at least two of the slots each include a discrete conductive segment representing a turn belonging to one of the plurality of windings. The stator assembly further includes an interconnect which electrically connects respective ends of the discrete conductive segments.

In accordance with yet another aspect of the invention, a method is provided for making a stator assembly for a multi-phase motor. The method includes the steps of forming a stator including a plurality of teeth and a plurality of slots defined between the teeth; forming a plurality of conductive segments having discrete ends; providing the plurality of conductive segments in respective ones of the plurality of slots; and forming interconnections between the discrete ends of the conductive segments such that each of the conductive segments represents a turn within a slot of one of a plurality of windings representing respective phases of the multi-phase motor.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 3 is a schematic view illustrating a manner for interconnecting single turn windings within the stator in accordance with an embodiment of the present invention;

FIG. 4 is a schematic view illustrating a different manner for interconnecting single turn windings within the stator in accordance with another embodiment of the present invention;

FIG. 6 is a side view of the stator and windings (in relevant part) of the motor of FIG. 1 according to another embodiment of the present invention;

DETAILED DESCRIPTION OF THE INVENTION

The present invention is a motor which is suitable for use in small actuation systems without sacrificing cost and/or performance, as will become more apparent based on the following detailed description. Generally speaking, the present invention is a motor, and preferably a multi-phase brushless DC motor, produced with a small number stator windings within each slot. In a preferred embodiment, there is only a single turn winding within a given slot. As will be appreciated, the single turn stator windings allow the conductor (e.g., copper) fill of the stator slots to be maximized. The resulting motor is operated by what may be viewed as an exceptionally low voltage, high current inverter.

The motor of the present invention offers many advantages over conventional designs. For example, the maximized fill of the stator slots allows for a reduction in stator cross section, thus allowing for a larger rotor diameter for a given overall diameter. Moreover, the interconnection of the single turn or few turn windings can be performed by automated processes such as wire bonding as used in the hybrid electronics industry as discussed below.

The low voltage, high current inverter (servo-amplifier) drives the motor and operates preferably in a different voltage/current regime than the inverters used with conventional motors. Specifically, the present invention incorporates an inverter which utilizes high current power switches, such as those recently developed for use in desktop computing as is explained in more detail below.

The motor of the present invention will now be described with reference to the drawings, wherein like reference labels are used to refer to like elements throughout.

Figure 1:
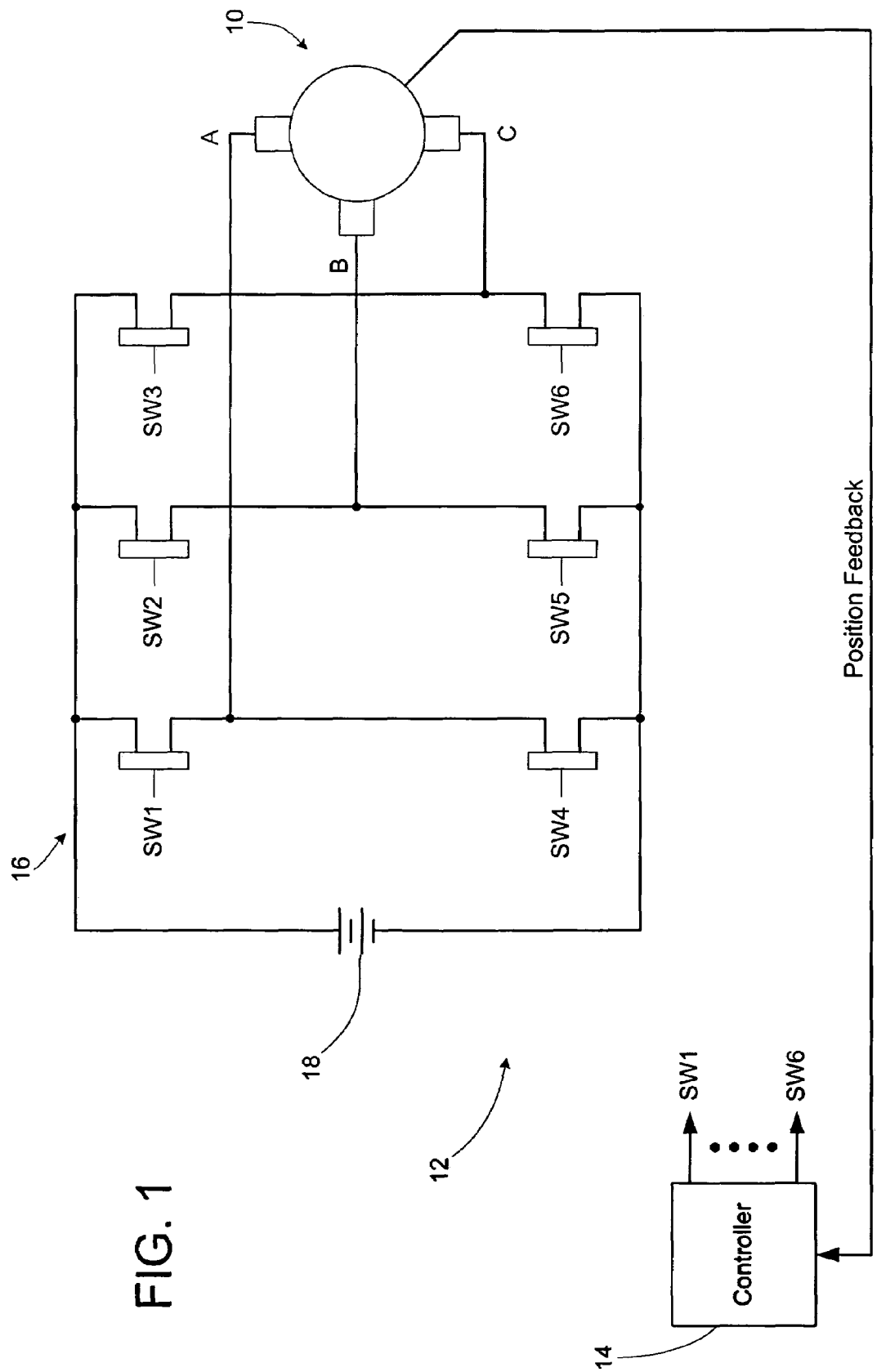
FIG. 1 is a schematic diagram of a maximum conductor multi-phase brushless DC motor in accordance with an embodiment of the present invention.

Referring initially to FIG. 1, a, maximum conductor motor 10 and inverter 12 are shown in accordance with an exemplary embodiment of the invention. In the exemplary embodiment, the motor 10 is a three-phase brushless DC motor, although it will be appreciated that the motor 10 could instead include some other number of phases without necessarily departing from the scope of the invention. Also, the motor 10 may include brushes and/or be an AC motor without necessarily departing from the scope of the invention.

The inverter 12 includes a controller 14 and a switching network 16. The switching network 16 includes a DC source such as a voltage/current supply 18 together with a plurality of switches SW1 thru SW6. The voltage/current supply 18 and switches SW1-SW6 are configured to provide three-phase power (Phases A, B and C) to the motor 10 as will be readily understood by those having ordinary skill in the art. The windings of the motor 10 may be connected in a delta or wye configuration, for example.

The controller 14 is configured as is conventional to provide switching control signals to the switches SW1-SW6 such that the switches are turned on/off at appropriate times to apply three-phase power voltages to the motor 10. In the exemplary embodiment, the motor 10 includes one or more rotor position sensors (not shown) such as a Hall effect device or the like, which provide position feedback signal(s) to the controller 14. Based on such feedback signal(s), the controller 14 turns on/off the switches SW1-SW6 in known fashion in order to apply the appropriate phase voltages from the voltage/current supply 18 to the motor 10.

As will be explained in further detail below in connection with FIGS. 2-6, the motor 10 includes a stator having slots which, unlike conventional motors, preferably includes only a single turn of any given phase winding. By making the winding in each slot a single turn, the motor 10 may be manufactured without labor intensive hand winding, etc. In the smallest motors 10, such approach is believed to enable levels of performance not currently possible with conventional motor design. Even if each slot 10 includes a small number of turns, e.g., 10 or less, the present invention still provides advantage in reduced fabor, etc.

In the preferred embodiment, since each slot in the motor stator includes only a single turn winding of a given phase, the resulting torque constant, back emf, inductance and resistance of the motor 10 will be very low as will be discussed herein. Consequently, the switching network 16 of the inverter 12 must be capable of high current, low voltage electronic switching. The present invention draws from recent developments in the desktop computer market. Specifically, power switches have been developed that can handle the high currents and rapid switching called for by the motor 10. For example, the switches SW1-SW6 may be any of a variety of commercially available power switches such as DirectFET™ power MOSFETs from International Rectifier, or similar devices from Vishay Company. Such switches make the high current, low voltage switching of the inverter 12 both feasible and inexpensive.

Figure 2:
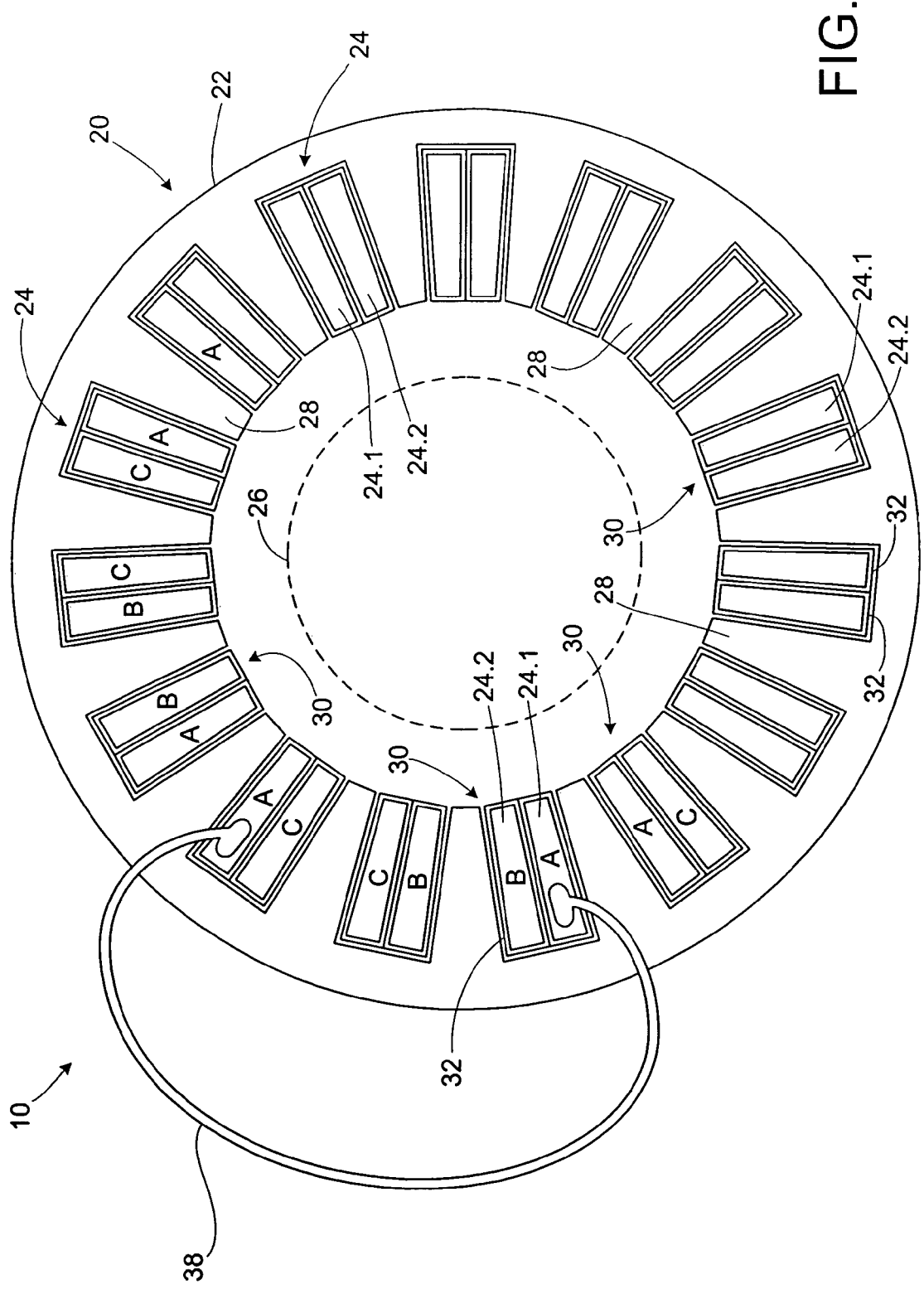
FIG. 2 is a plan view of the stator and windings (in relevant part) of the motor of FIG. 1 in accordance with an embodiment of the present invention.

Referring now to FIG. 2, the motor 10 is shown in relevant part in accordance with an embodiment of the present invention. The motor 10 includes a stator assembly 20 made up of a stator 22 and windings (generally designated 24). In addition, the motor 10 includes a rotor 26 shown in phantom. The rotor 26 is of conventional construction. Thus, further detail as to the rotor 26 has been omitted for sake of brevity.

The stator 22 is conventional in that it includes a plurality of teeth 28 and a plurality of slots 30 defined between respectively adjacent teeth 28. The stator 22 is further conventional in that it may be made up of a stack of laminations, etc. In another embodiment, as discussed below, for example, the stator 22 may be a conventional slotless stator. The particular makeup of the stator 22 itself also is not germane to the invention, and thus further detail has been omitted for sake of brevity.

In the exemplary embodiment, each slot 30 includes two copper bars 24.1 and 24.2, respectively. The copper bars 24.1 and 24.2 are positioned side-by-side within the slot 30 and each represent an electrical conductor. Although the bars 24.1 and 24.2 are preferably copper in the exemplary embodiment, other electrically conductive materials may be used without departing from the scope of the invention.

The copper bars 24.1 and 24.2 represent winding segments and run the length of the respective slot 30. Moreover, the copper bars 24.1 and 24.2 are sized such that when positioned side-by-side in the respective slot 30, the copper bars 24.1 and 24.2 fill substantially all of the cross-section of the slot 30 (i.e., in the plane shown in FIG. 2). The copper bars 24.1 and 24.2 each include an electrically insulating sheath 32 which serves to insulate the copper bars from one another while minimizing the non-electrically conducting fill within the cross-section of each slot 30. The sheath 32 may be made of a layer of varnish, rubber, high-temperature plastic, etc., as will be appreciated.

In accordance with the invention, the copper bars 24.1 and 24.2 in each of the slots 30 are interconnected in a predetermined manner at their respective ends. More specifically, the respective ends of the copper bars 24.1 and 24.2 are exposed at the top and bottom of the stator stack 22. The copper bars 24.1 and 24.2 are interconnected with each other such that each copper bar represents a single turn belonging to one of the windings (i.e., the A-phase winding, the B-phase winding or the C-phase winding). The manner in which the windings of the different phases are distributed throughout the slots 30 is conventional in accordance with multi-phase motor winding techniques. The present invention is not intended to be limited to any particular distribution pattern of the different phases as will be appreciated. The present invention is different from conventional winding techniques in the sense that instead of many turns for a given winding being present in a slot, each copper bar within a slot 30 forms only a single turn for a respective winding.

Thus, for example, FIG. 2 illustrates how a given slot 30 includes copper bars 24.1 and 24.2 designated as being a single turn for the A-phase winding and the B-phase winding, respectively. Although shown in FIG. 2 only for two turns each belonging to the A-phase winding, respective turns for the respective windings are electrically connected by an interconnect 38. Each interconnect 38 may be, for example, a wire which is wire bonded to the copper bars 24.1 and 24.2 at respective ends using conventional wire bonding techniques as shown more clearly in FIG. 3. Alternatively, for example, each interconnect 38 may be a conductive bar soldered or welded at respective ends to the copper bars 24.1 and 24.2 as shown in FIG. 4.

As will be appreciated by those having ordinary skill in the art, other techniques may be used for forming each interconnect without departing from the intended scope of the invention. For example, the interconnects 38 may be formed using electrodeposition, electrical connectors, soldering, welding, cold forming, stereolithography, etc. The present invention is not necessarily limited to a particular manner for forming the interconnects 38 unless otherwise specified.

Figure 5:
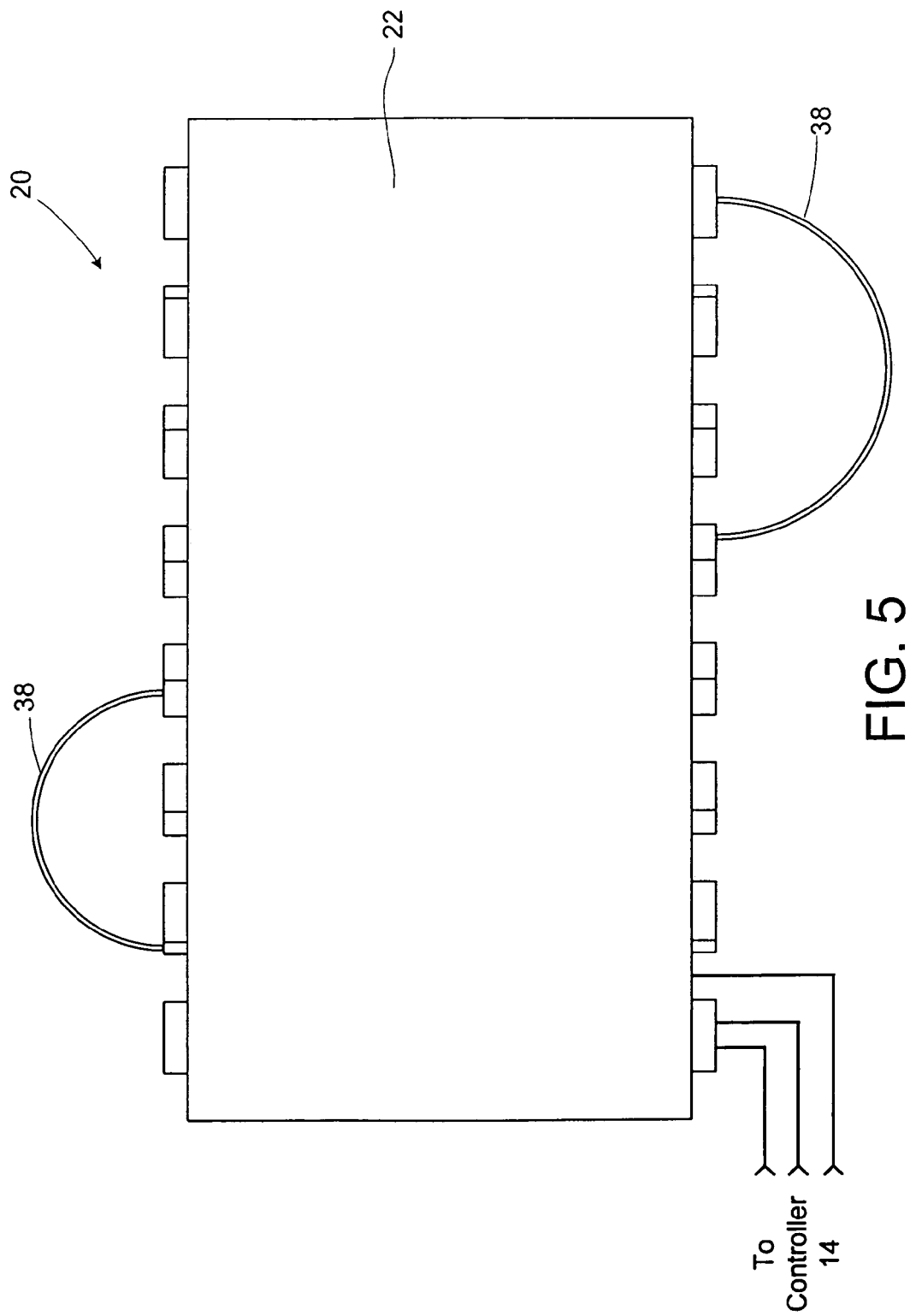
FIG. 5 is a side view of the stator and windings (in relevant part) of the motor of FIG. 1 according to an embodiment of the present invention.

Referring to FIG. 5, the interconnects 38 may be used to form the appropriate phase winding interconnections between the copper bar ends on both the top and bottom of the stator assembly 20. In addition, or in the alternative, the copper bars 24.1 and 24.2 may be formed and bent as represented in FIG. 6 in order to form a pair of connected turns. For example, the copper bar 24.2 in FIG. 6 is shaped in somewhat of a U-shape. The sides of the U are inserted into corresponding slots 30 to represent a single turn of a given winding within the slots. The base of the U forms an electrical interconnect between the turns.

Figure 6A:
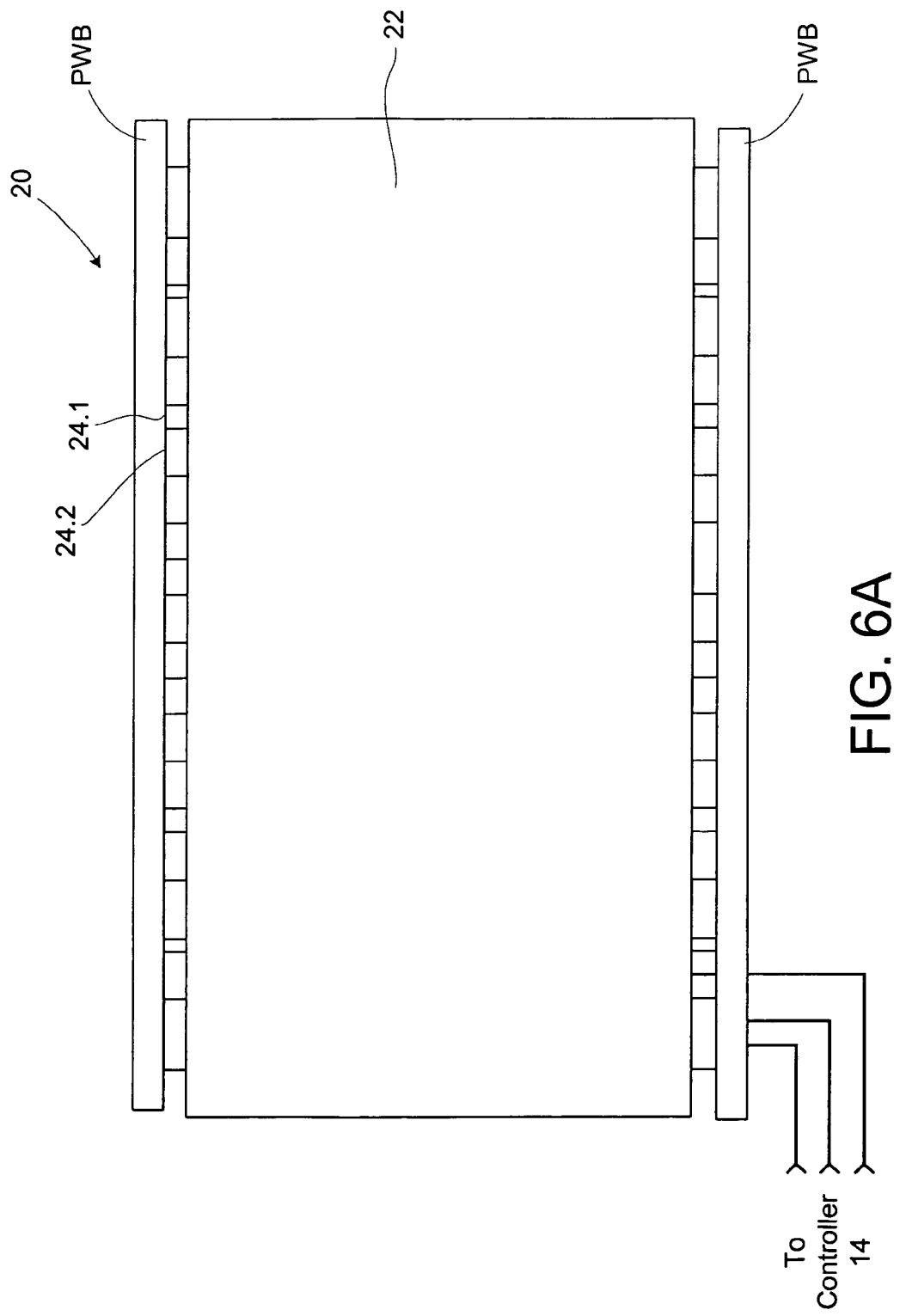
FIG. 6A is a side view of the stator and windings (in relevant part) of the motor of FIG. 1 according to another embodiment of the present invention.

FIG. 6A shows another embodiment analogous to the embodiment of FIG. 5, with the exception that the interconnects 38 are formed by particular wiring patterns included in/on a printed wiring board (PWB). The ends of the copper bars 24.1 and 24.2 can be mounted to the respective wiring pattern in/on the PWB(s) using conventional surface mounting techniques, as will be appreciated.

For ease of illustration, it will be appreciated that the drawings herein show only but a few of the interconnections between the turns. However, even with all of the appropriate connections between the copper bars 24.1 and 24.2 for the respective phases, it will be appreciated that the labor associated with making such connections is much less than that required for forming conventional multi-turn windings, particularly with smaller sized motors.

Although the above embodiments have been described primarily in the context of there being only a single turn of a winding in a given slot, it will be appreciated that a larger number of windings could be utilized in a given slot. However, it will be necessary to then provide additional interconnects 38 to interconnect the multiple windings as will be appreciated. Thus, the present invention is preferably limited to a smaller number of turns (i.e., ten or less), within a given slot.

Figure 7A:
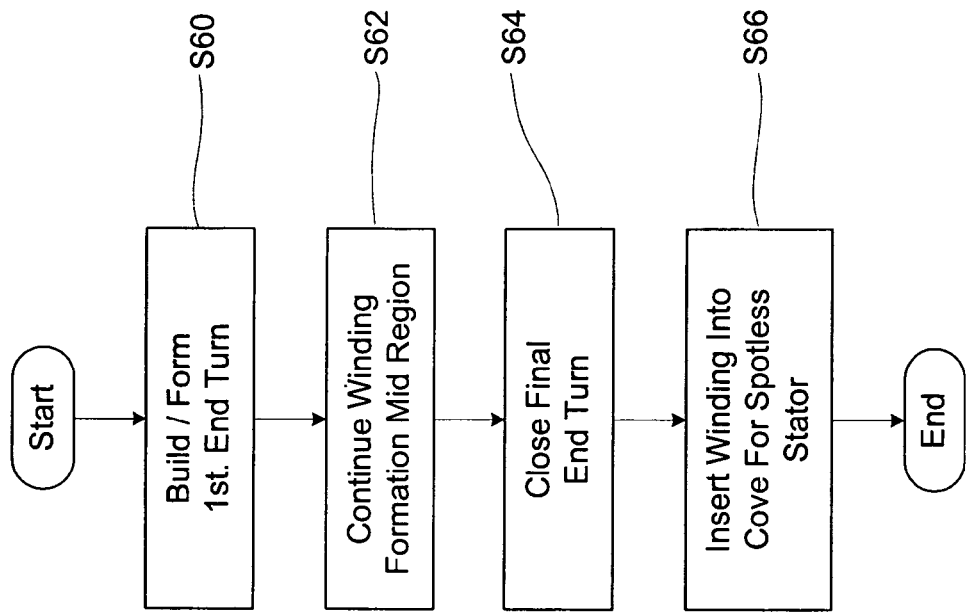
FIGS. 7 and 7A are flowcharts representing methods for making the stator and windings of the motor of FIG. 1 according to embodiments of the present invention.
Figure 7:
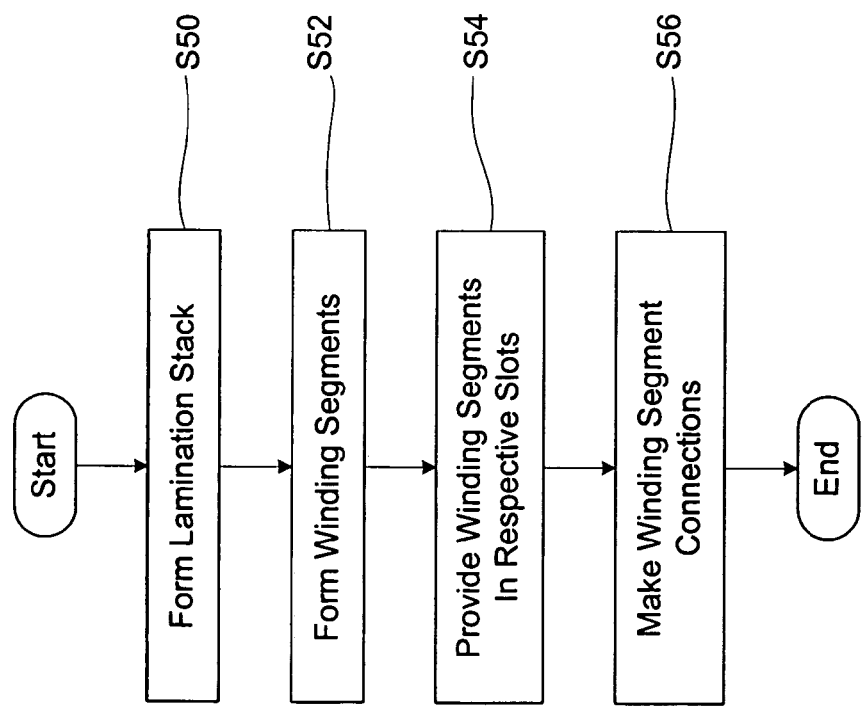

FIG. 7 is a flowchart representing a method for making the stator assembly 20 according to an embodiment of FIGS. 1 and 2 of the present invention. In step S50, the stator 22 is formed of a lamination stack with teeth 28 and slots 30. The stator 22 may be formed using conventional stator forming techniques, and thus further detail, is omitted.

In step S52, the winding segments (e.g., copper bars 24.1 and 24.2) for the slots 30 are formed. In one embodiment, the segments are extruded using an electrically conductive material and cut to length. The insulating sheath 32 can be formed separately or as part of the extrusion process. In another embodiment, the segments may be cast in the appropriate shape and length. Although extrusion or casting represent preferred manners for forming the segments, any method may be used without departing from the scope of the invention.

In step S54, the segments (e.g., copper bars 24.1 and 24.2) are provided in the respective slots 30. This can be done by manual or automated insertion, for example. Alternatively, steps S52 and S53 may be combined in which the segments are cast in place within the slots 30 using the sides of the slots as sides of the molds, for example. Finally, in step S56 the segments are connected together via interconnects 38. As noted above, the interconnects 38 may be done using manual or automated wire bonding techniques, welding of other types of connectors between the segments forming the respective phases, PWB(s), soldering, cold forming, stereolithography, etc. Alternatively, other techniques may be used for connecting the ends of respective segments as will be appreciated.

Referring back to FIG. 2, the present invention's use of a single turn per phase winding within a given slot 30 allows the conductive fill within a slot to be maximized. The present invention avoids a reduction in fill amount within the slot due to air, varnish, etc., as has been shown to occur in the case of many windings. Preferably, the single turns within each slot 30 fills greater than 50% of the cross-sectional area of each slot 30. More preferably, the single turns within each slot 30 fills greater than 75% of the cross-sectional area of each slot 30. Even more preferably, the single turns within each slot 30 fills greater than 90% of the cross-sectional area of each slot 30.

As is shown in FIG. 2, each of the slots 30 has a cross-sectional area and the combined cross-sectional area of the respective copper bars 24.1 and 24.2 included in each of the slots is generally the same as the cross-sectional area of the slot. In the embodiment of FIG. 2, the slots 30 have a cross-sectional area which is generally rectangular. It will be appreciated, however, that other cross-sectional shapes are possible without departing from the scope of the invention. For example, each of the slots 30 may have a cross-sectional area which is generally circular. The copper bars 24.1 and 24.2 may have cross-sectional areas in the shape of half circles in such case which, when placed side-by-side, form a circle. Alternatively, other cross-sectional shapes are possible, whether rectangular, circular, non-circular, etc., as will be appreciated.

Applying motor principles, the present invention in which each slot 30 has a single turn winding for a given phrase can be compared to an otherwise comparable conventional motor having N number of turns in each slot. The motor in accordance with the present invention has ultra low inductance (e.g., $Lm/N^2$), where Lm represents the inductance of the conventional motor. The motor of the present invention also has ultra low resistance (e.g., $<Rm/N^2$), where Rm represents the resistance of the conventional motor. Further, the motor of the present invention has a higher motor constant (>Km*N) and a lower torque constant (Kt/N), where Km and Kt represent the motor constant and torque constant of the conventional motor, respectively. The motor of the present invention also has a lower back EMF constant (Kb/N), where Kb represents the back EMF constant of the conventional motor.

Accordingly, the motor of the present invention may have a bus voltage (e.g., $V_{batt}$) of 1.5 to 10.0 volts with phase currents on the order of 10 to 100+ amperes. The aforementioned International Rectifier DirectFET™ switches provide an RDSon resistance of less than 2 milliohms, and switching at 1 megahertz or higher, and are therefore capable of handling such high currents. The conventional motor, on the other hand, has a bus voltage on the order of 25.0 to 60.0 volts and phase currents of 1.5 to 8.0 amperes. With conventional MOSFET switches, the RDSon resistance is approximately 50 to 200 milliohms.

A typical small conventional motor may have a stator with an outer diameter equal to 0.84 inch and N=25. The smallest practical conventional motor may have a stator with an outer diameter equal to 0.625 inch. The difficulty in providing the multiple-turn windings within the stator slots results in significant manufacturing costs, however. The present invention, on the other hand, makes motors having outer diameters of the stator as 0.25 inch both practical to make and useful insofar as performance, etc.

The present invention also has application with respect to slotless stators. For example, conductive segments 24.1 And 24.2 may be combined with interconnects 38 to form a winding pattern subsequently used to form a slotless stator. FIG. 7A is a flowchart illustrating such an example.

In step S60 of FIG. 7A, a first turn of a winding is formed by combining conductive segments 24.1 and 24.2, which can be straight and/or u-shaped, and one or more interconnects 38. The process is continued in step S62, where turns continue to be added to one another to continue the winding. In step S64, the last turn of the winding is provided via the combination of conductive segments 24.1, 24.2 and interconnect(s) 38. Thereafter, the thus fabricated winding may be inserted in a core for the slotless stator as represented in step S66.

Figure 8:
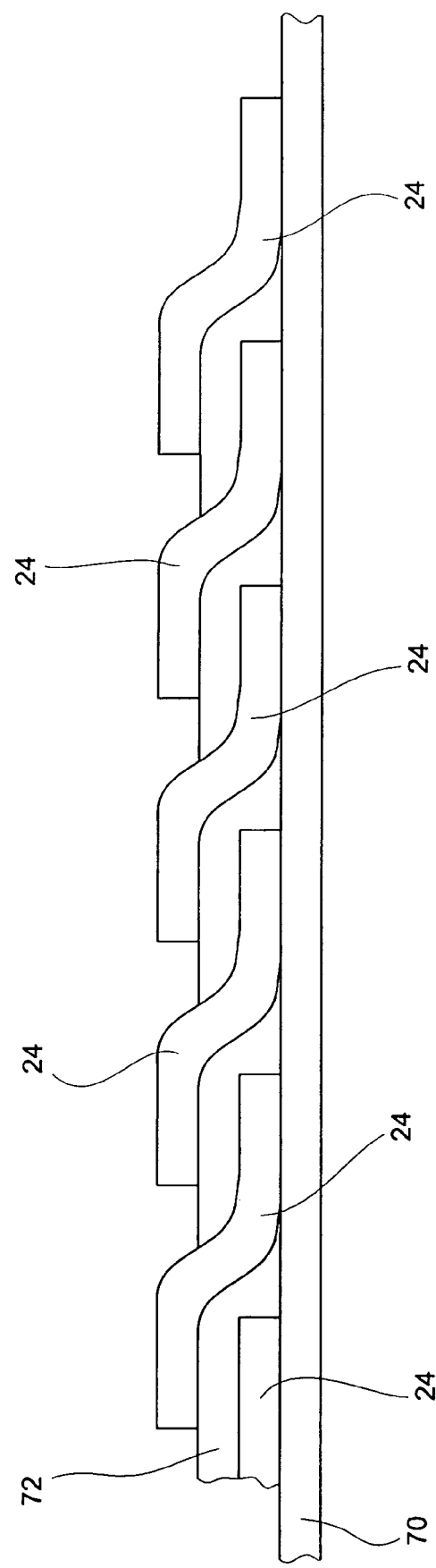
FIG. 8 is a schematic side view of the stator and windings according to yet another embodiment of the present invention.

FIG. 8 is a partial side view of yet another embodiment of the invention. Each turn 24 of a winding may be formed by photolithography or stereolithography essentially layer by layer. For example, FIG. 8 illustrates a series of turns 24 formed on a flexible substrate 70. A turn 24 may first be formed as a layer, and then an isolation layer 72 patterned thereon and another turn 24 formed thereon, and so on. The respective turns 24 can be interconnected using through holes or vias, as well known in the art of lithography.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A stator assembly for a multi-phase motor, comprising:
   a stator including a plurality of teeth and a plurality of slots defined between the teeth; and
   a plurality of windings representing respective phases of the multi-phase motor, the windings being wound within the slots and around the teeth to define respective magnetic poles,
   wherein each slot includes no more than a single turn of any given one of the plurality of windings.

2. The stator assembly of claim 1, wherein each slot includes a single turn of at least two different windings.

3. The stator assembly of claim 1, wherein a single turn belonging to one of the plurality of phases is electrically connected by wire bonding to a single turn in a different one of the slots and belonging to the same phase.

4. The stator assembly of claim 1, wherein a single turn belonging to one of the plurality of phases is electrically connected by a welded conductive bar to a single turn in a different one of the slots and belonging to the same phase.

5. The stator assembly of claim 1, wherein a single turn belonging to one of the plurality of phases is electrically connected by a cast conductive bar to a single turn in a different one of the slots and belonging to the same phase.

6. The stator assembly of claim 1, wherein the single turns within the slots are each formed of a respective conductive segment.

7. The stator assembly of claim 6, wherein the respective conductive segments are extrusions cut to length and inserted in respective slots.

8. The stator assembly of claim 6, wherein the respective conductive segments are casts formed within the respective slots.

9. The stator assembly of claim 1, wherein each of the slots has a cross-sectional area and the no more than a single turn of any of the plurality of windings included in each of the slots fills greater than 50% of the cross-sectional area.

10. The stator assembly of claim 9, wherein the no more than a single turn of any of the plurality of windings included in each of the slots fills greater than 75% of the cross-sectional area.

11. The stator assembly of claim 9, wherein the no more than a single turn of any of the plurality of windings included in each of the slots fills greater than 90% of the cross-sectional area.

12. The stator assembly of claim 1, wherein each of the slots has a cross-sectional area and a combined cross-sectional area of the no more than a single turn of any of the plurality of windings included in each of the slots is generally the same as the cross-sectional area of the slot.

13. The stator assembly of claim 12, wherein each of the slots has a cross-sectional area which is generally rectangular.

14. The stator assembly of claim 12, wherein each of the slots has a cross-sectional area which is generally circular.

15. The stator assembly of claim 1, wherein a cross-sectional area of each of the single turns is non-circular.

16. A multi-phase motor comprising the stator assembly of claim 1, and further comprising a rotor.

17. The multi-phase motor of claim 16, further comprising an inverter for selectively applying predefined voltages to the plurality of windings.

18. The multi-phase motor of claim 17, wherein the inverter comprises a plurality of low voltage, high current semiconductor switches.

19. A stator assembly for a multi-phase motor, comprising:
   a stator including a plurality of teeth and a plurality of slots defined between the teeth; and
   a plurality of windings representing respective phases of the multi-phase motor, the windings being wound within the slots and around the teeth to define respective magnetic poles,
   wherein at least two of the slots each include a discrete conductive segment representing a turn belonging to one of the plurality of windings, and further comprising an interconnect which electrically connects respective ends of the discrete conductive segments.

20. The stator assembly of claim 19, wherein the interconnect is formed by a wire bonding.

21. The stator assembly of claim 19, wherein the interconnect is formed by a welded conductive bar.

22. The stator assembly of claim 19, wherein the interconnect is formed by a cast conductive bar.

23. A multi-phase motor comprising the stator assembly of claim 19, and further comprising a rotor.

24. The multi-phase motor of claim 23, further comprising an inverter for selectively applying predefined voltages to the plurality of windings.

25. A method of making a stator assembly for a multi-phase motor, comprising the steps of:
   forming a stator including a plurality of teeth and a plurality of slots defined between the teeth;
   forming a plurality of conductive segments having discrete ends;
   providing the plurality of conductive segments in respective ones of the plurality of slots; and
   forming interconnections between the discrete ends of the conductive segments such that each of the conductive segments represents a turn within a slot of one of a plurality of windings representing respective phases of the multi-phase motor.

26. The method of claim 25, wherein each slot includes no more than a single segment belonging to any given one of the plurality of windings.

27. The method of claim 26, wherein each slot includes a single segment of at least two different windings.

28. The method of claim 25, wherein each slot includes no more than ten turns of a given one of the plurality of windings.

29. The method of claim 25, wherein the step of forming interconnections comprises wire bonding.

30. The method of claim 25, wherein the step of forming interconnections comprises soldering.

31. The method of claim 25, wherein the step of forming interconnections comprises using electrical connectors.

32. The method of claim 25, wherein the step of forming interconnections comprises welding.

33. The method of claim 25, wherein the step of forming interconnections comprises cold forming.

34. The method of claim 29, wherein the step of forming interconnections comprises stereolithography.

35. The method of claim 29, wherein the step of forming interconnections comprises using a printed wiring board.

36. A method of making stator assembly, comprising the steps of:
   forming layer upon layer of a conductive material and isolation material using lithography to form stator windings.

37. The method of claim 36, wherein the layer upon layer are formed on a flexible substrate.

38. A stator assembly for a multi-phase motor, comprising:
   a stator core;
   a plurality of windings representing respective phases of the multi-phase motor, wherein each winding includes a plurality of complete turns each formed by a less than complete turn and a discrete interconnection to another less than complete turn.

* * * * *